(12) United States Patent
Takubo et al.

(10) Patent No.: US 6,594,988 B2
(45) Date of Patent: Jul. 22, 2003

(54) AIR/FUEL RATIO CONTROL APPARATUS FOR AN INTERNAL COMBUSTION ENGINE

(75) Inventors: Hideki Takubo, Tokyo (JP); Tadahiro Azuma, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 64 days.

(21) Appl. No.: 09/998,424

(22) Filed: Dec. 3, 2001

(65) Prior Publication Data

US 2003/0000206 A1 Jan. 2, 2003

(30) Foreign Application Priority Data

Jun. 28, 2001 (JP) .................................... 2001-196363

(51) Int. Cl.[7] ................................................ F01N 3/00
(52) U.S. Cl. ...................................... 60/285; 60/276
(58) Field of Search ............................ 60/285, 276, 299

(56) References Cited

U.S. PATENT DOCUMENTS

| | | | | |
|---|---|---|---|---|
| 4,745,741 A | * | 5/1988 | Masui et al. .................. 60/274 |
| 4,905,469 A | * | 3/1990 | Matsuoka ..................... 60/276 |
| 4,964,271 A | * | 10/1990 | Sawada et al. ............... 60/274 |
| 5,022,225 A | * | 6/1991 | Sawada et al. ............... 60/274 |
| 5,953,910 A | * | 9/1999 | Sato et al. .................... 60/277 |
| 6,018,945 A | * | 2/2000 | Nakagawa .................... 60/276 |
| 6,256,983 B1 | * | 7/2001 | Yasui ........................... 701/109 |
| 6,292,739 B1 | * | 9/2001 | Yasui et al. .................. 701/109 |
| 6,327,852 B1 | * | 12/2001 | Hirose ......................... 60/297 |
| 6,349,540 B1 | * | 2/2002 | Nakayama et al. ........... 60/277 |
| 6,405,527 B2 | * | 6/2002 | Suzuki et al. ................. 60/285 |
| 6,502,391 B1 | * | 1/2003 | Hirota et al. .................. 60/288 |

FOREIGN PATENT DOCUMENTS

| | | | | |
|---|---|---|---|---|
| JP | 8-193537 | 7/1996 | ............ F02D/41/14 |
| JP | 11-280457 | 10/1999 | ............. F01N/3/24 |

\* cited by examiner

*Primary Examiner*—Thomas Denion
*Assistant Examiner*—Diem Tran
(74) *Attorney, Agent, or Firm*—Sughrue Mion, PLLC

(57) ABSTRACT

Achieved is an air/fuel ratio control apparatus for an internal combustion engine where the purification ability of a three-way catalyst is brought back to an optimal state immediately after a fuel cut by expelling oxygen absorbed by the three-way catalyst due to the fuel cut without being affected by the oxygen absorption amount of the three-way catalyst before the fuel cut.

2 Claims, 12 Drawing Sheets

AIR/FUEL RATIO CONTROL APPARATUS FOR AN INTERNAL COMBUSTION ENGINE

This application is based on Application No.2001-196363, field in Japan on Jun. 28, 2001, the contents of which are hereby incorporated by reference.

BACKGROUND OF THE INVENTION

1. Field of the Invention

This invention relates to an air/fuel ratio control apparatus for an internal combustion engine, and more specifically, to an air/fuel ratio control apparatus for an internal combustion engine that removes poisonous components present in an exhaust gas using a catalytic purifying device provided in an exhaust system path.

2. Related Background Art

Conventionally, there has been well known an air/fuel ratio control apparatus for an internal combustion engine that has an exhaust gas purifying function of removing poisonous components, such as NOx, HC, and CO, emitted from the internal combustion engine. To achieve this function, a three-way catalyst for removing such poisonous components in an exhaust gas is provided in an exhaust system of the internal combustion engine.

If a fuel cut is performed, however, a large amount of oxygen is absorbed by the three-way catalyst, so that even if the fuel cut is reset afterward, the air/fuel ratio does not immediately return to the state before the fuel cut is started. This causes an excess oxygen state, in which an NOx reduction action becomes inactive and the three-way catalyst cannot fully exert its effect. As a result, there is the danger of poisonous components being discharged into the air.

In view of this problem, a technique of suppressing the amount of NOx discharged after the reset of the fuel cut is disclosed in Japanese Patent Application Laid-open No. Hei 8-193537 (hereinafter, the "first prior art"). With this technique, the amount of oxygen absorbed by a three-way catalyst during a fuel cut is obtained based on an intake air amount or a period of time of the fuel cut. When the fuel cut is reset, an air/fuel ratio is controlled to be on a rich side close to a theoretical air/fuel ratio for a very short time period according to the amount of the absorbed oxygen. In this manner, the amount of NOx discharged after the reset of a fuel cut is suppressed.

Another technique of solving the stated problem is disclosed in Japanese Patent Application Laid-open No. Hei 11-280457 (hereinafter, the "second prior art"). With this technique, the amount of oxygen absorbed by a three-way catalyst during a fuel cut is obtained based on an intake air amount or period of the fuel cut. When the fuel cut is reset, an air/fuel ratio is enriched in a step-by-step manner using an initial value corresponding to the amount of the absorbed oxygen, and then the enriched air/fuel ratio is brought back to an theoretical air/fuel ratio at a predetermined speed, thereby suppressing the amount of NOx discharged after the reset of the fuel cut. Also, after the enrich processing is temporarily suspended by acceleration, it is judged whether the three-way catalyst returns to the state before the fuel cut according to the output of an oxygen concentration sensor arranged downstream of the catalyst. If it is judged that the catalyst returns to the original state, re-enrich processing is not performed.

Even in the case of a fuel cut where the same amount of oxygen is supplied according to the amount of oxygen absorbed by a catalyst before the fuel cut, there may occur a phenomenon where the amount of oxygen absorbed varies after the fuel cut and therefore the deterioration degree of an NOx purification rate changes. For instance, if the oxygen absorption amount of a catalyst before a fuel cut is small and the catalyst is in a rich state, this may result in a situation where the fuel cut does not increase the amount of absorbed oxygen to a level where the NOx purification rate is decreased. Conversely, if the catalyst oxygen absorption amount before a fuel cut is large and the catalyst is in a lean state, this may cause a situation where the NOx purification rate is significantly decreased even by a fuel cut performed for a short time.

As described above, there are variations in the amount of oxygen absorbed by a catalyst before fuel cuts and therefore there occur variations in the oxygen absorption amount of the catalyst when the fuel cuts are reset. This creates the necessity to appropriately perform enrich processing according to the oxygen absorption amounts of the catalyst after the fuel cuts.

In the first and second prior arts, however, enrich processing is performed only according to the amount of oxygen supplied during a fuel cut and the oxygen absorption state of a catalyst after the fuel cut is not taken into account during the enrich processing. This causes variations in the catalyst oxygen absorption amount after the rich processing. As a result, there may occur a problem that too enriched catalyst reduces a THC purification rate, or a problem that enrich processing is not sufficiently performed and the Nox purification rate does not return to an adequate level.

Also, there has been recently devised a catalyst system that increases a purification efficiency by providing two three-way catalysts (hereinafter respectively referred to as a "front three-way catalyst" and a "rear three-way catalyst"), with the rear three-way catalyst being arranged at a position downstream of the front three-way catalyst. In this system, poisonous components in an exhaust gas are purified as much as possible (about 90% or more of the components are removed, for instance) by the front three-way catalyst and the poisonous gas that is not purified by the front three-way catalyst is purified by the rear three-way catalyst with reliability. This makes it possible to raise the exhaust gas purification rate to around 100% in total using the front and rear three-way catalysts. To achieve this high purification rate, it is required to always maintain both of the front and rear three-way catalysts in conditions where optimal exhaust purification capacities are obtained.

If a fuel cut is performed in such a catalyst system where a front three-way catalyst and a rear three-way catalyst are provided, however, a phenomenon may occur where there is a difference in oxygen absorption amount between the front and rear three-way catalysts.

If most of oxygen supplied by a fuel cut is absorbed by a front three-way catalyst, for instance, a rear three-way catalyst hardly absorbs oxygen, so that it is sufficient that enrich processing is performed only for the front three-way catalyst after the fuel cut is reset.

Also, if a large amount of oxygen exceeding the absorption capacity of a front three-way catalyst is supplied by a fuel cut, the oxygen absorption amount of a rear three-way catalyst is also increased, so that it becomes necessary to perform enrich processing for both of the front and rear three-way catalysts after the fuel cut is reset.

Such a variation in the amount of oxygen supplied to a rear three-way catalyst by a fuel cut is caused by the oxygen absorption state of a front three-way catalyst during the fuel cut.

Even in the case of the fuel cut, as described above, where the same amount of oxygen is supplied, the oxygen absorption state of the front three-way catalyst before the fuel cut causes a variation in the oxygen absorption state of the front three-way catalyst during the fuel cut, so that the supply of oxygen to the rear three-way catalyst is also affected.

That is, to accurately detect the amount of oxygen absorbed by a rear three-way catalyst during a fuel cut, it is required to detect the oxygen absorption amount of a front three-way catalyst during the fuel cut and to estimate the amount of oxygen flowing to the rear three-way catalyst.

In the first and second prior arts, however, enrich processing is performed only according to the amount of oxygen supplied by a fuel cut and therefore the oxygen absorption amounts of a front three-way catalyst before and during the fuel cut are not taken into account during the enrich processing. This causes variations in the oxygen absorption amounts of the front and rear three-way catalysts after the rich processing. As a result, there may occur a problem that the front or rear three-way catalyst becomes too rich and therefore the THC purification rate is reduced or a problem that enrich processing is not sufficiently performed and the Nox purification rate does not return to an adequate level.

Also, to remove oxygen absorbed by a rear three-way catalyst due to a fuel cut, it is required to supply a rich air/fuel mixture to the rear three-way catalyst. Therefore, during the removal of oxygen absorbed by the rear three-way catalyst, a front three-way catalyst needs to be shifted from an optimal state to a rich state to reduce THC and CO purification rates. In this case, rich exhaust gas including large amounts of THC and CO is supplied, so that oxygen absorbed by the rear three-way catalyst at a position downstream of the front three-way catalyst is removed and THC and CO that were not purified by the front three-way catalyst are consumed by the removal of oxygen from the rear three-way catalyst. As a result, there is no fear of these poisonous components passing through the rear three-way catalyst and being discharged into the air.

Also, although enriching a front three-way catalyst with respect to an optimal state reduces THC and CO purification rates, it becomes possible to maintain a high NOx purification rate, to prevent NOx from flowing to a rear three-way catalyst whose NOx purification rate is reduced by oxygen absorption, and to prevent NOx from being discharged into the air.

However, objects of the first and second prior arts are to bring the oxygen absorption amount of a catalyst back to an optimal state by performing enrich processing after the reset of a fuel cut. Therefore, these prior arts do not contain a concept that a catalyst is enriched with respect to an optimal oxygen absorption state to remove oxygen absorbed by another catalyst arranged downstream. Therefore, there is a problem that it is difficult to remove oxygen absorbed by a rear three-way catalyst.

SUMMARY OF THE INVENTION

The present invention has been made to solve the stated problems and an object of the present invention is to achieve an air/fuel ratio control apparatus for an internal combustion engine where the purification ability of a three-way catalyst is brought back to an optimal state by expelling oxygen absorbed by the three-way catalyst due to a fuel cut immediately after the fuel cut without being affected by the oxygen absorption amount of the three-way catalyst before the fuel cut.

According to the present invention, there is provided an air/fuel ratio control apparatus for an internal combustion engine comprising: a three-way catalyst that is provided in an exhaust system of the internal combustion engine and removes poisonous substances present in an exhaust gas; an oxygen concentration sensor that detects an oxygen concentration of the exhaust gas passed through the three-way catalyst; a fuel injection valve that injects fuel into the internal combustion engine; an injection amount adjusting means for adjusting an amount of the fuel injected by the fuel injection valve so that an air/fuel ratio becomes a predetermined air/fuel ratio; an fuel injection suspending means for suspending the fuel injection by the fuel injection valve on a predetermined condition concerning an operational state of the internal combustion engine; and a correction factor setting means for setting an air/fuel ratio enrich correction factor according to a difference between an output voltage of the oxygen concentration sensor and a predetermined target voltage set for the oxygen concentration sensor, wherein, during a predetermined time after a fuel cut is reset by the fuel injection suspending means, the injection amount adjusting means performs air/fuel ratio enrich processing by adjusting the amount of the fuel injected by the fuel injection valve according to the air/fuel ratio enrich correction factor set by the correction factor setting means.

There is also provided an air/fuel ratio control apparatus, wherein the three-way catalyst is a front three-way catalyst, and the apparatus further comprises: a rear three-way catalyst that is provided downstream of the oxygen concentration sensor and removes poisonous substances present in the exhaust gas passed through the front three-way catalyst; an intake air amount detecting means for detecting an amount of intake air into the internal combustion engine; and an oxygen absorption amount estimating means for estimating an oxygen absorption amount of the rear three-way catalyst resulting from the fuel cut, according to the intake air amount detected by the intake air amount detecting means and the output voltage generated by the oxygen concentration sensor during the fuel cut by the fuel injection suspending means, wherein The correction factor setting means changes the target voltage set for the oxygen concentration sensor according to the oxygen absorption amount of the rear three-way catalyst estimated by the oxygen absorption amount estimating means.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

<First Embodiment>

Figure 1:
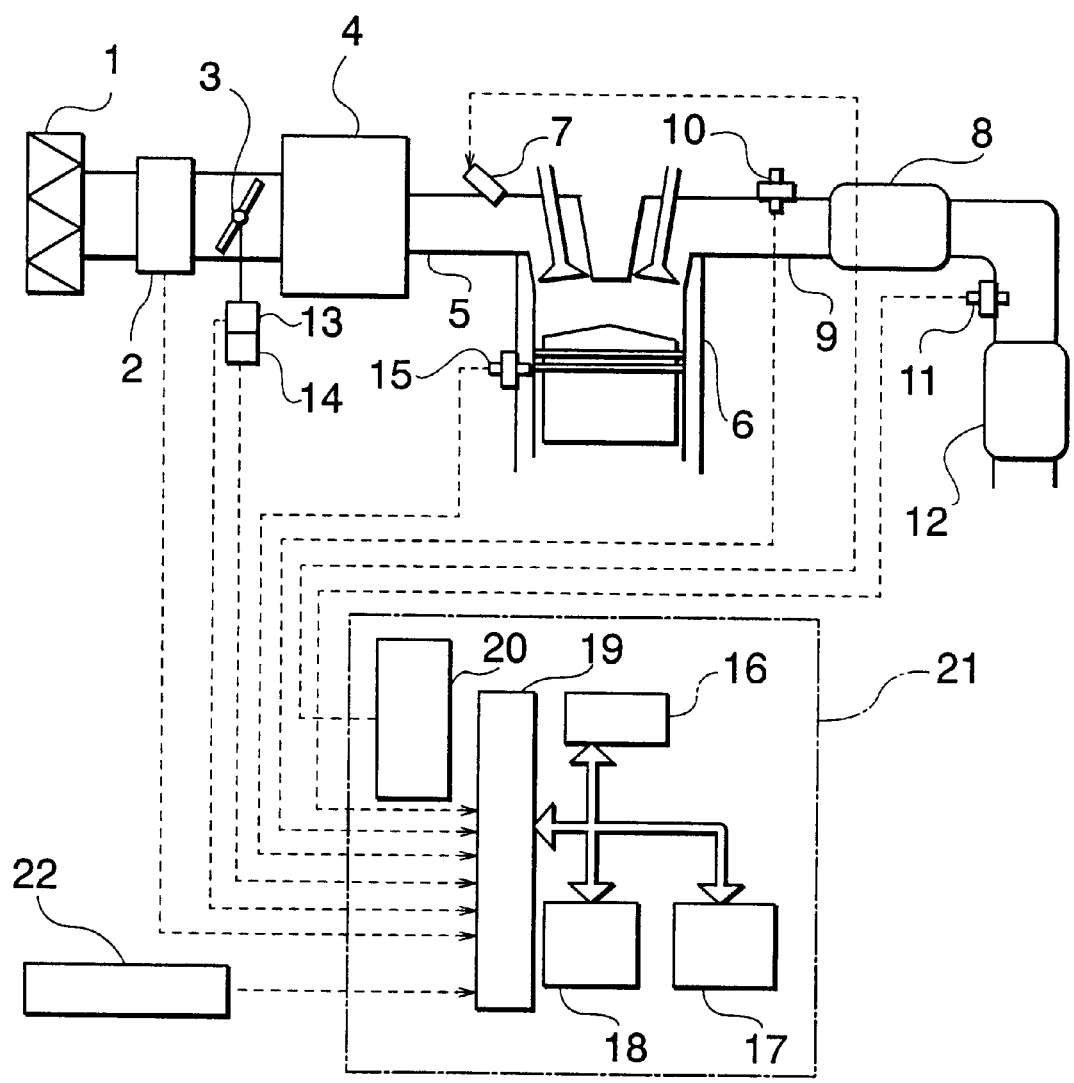
FIG. 1 shows the construction of an air/fuel ratio control apparatus for an internal combustion engine according to the first embodiment of the present invention.

FIG. 1 shows the construction of an air/fuel ratio control apparatus (engine) for an internal combustion engine according to the first embodiment of the present invention. In FIG. 1, an intake air amount Qa of cleaned intake air flowing from an air cleaner 1 is measured by an air-flow sensor 2. Then, the intake amount is controlled by a throttle value 3 according to loads, and the intake air is fed to respective cylinders of an engine (internal combustion engine) 6 via a surge tank 4 and an intake pipe 5.

On the other hand, fuel is injected into the intake pipe 5 via a fuel injection valve 7. A front three-way catalyst 8 is provided for an exhaust pipe 9 and purifies components such as HC, CO, and NOx present in an exhaust gas. Oxygen concentration sensors 10 and 11 (hereinafter respectively referred to as the "front oxygen concentration sensor 10" and the "rear oxygen concentration sensor 11") that each function as an air/fuel ratio sensor are respectively provided upstream and downstream of the front three-way catalyst 8 of the exhaust pipe 9. These oxygen concentration sensors 10 and 11 detect oxygen concentrations in the exhaust gas and supply electric signals corresponding to their detection values to an engine control unit 21. Note that this embodiment relates to a construction where a rear three-way catalyst 12 is not arranged.

The engine control unit 21 performing various controls, such as air/fuel ratio control and ignition timing control, is comprised of a microcomputer including a CPU 16, a ROM 17, and a RAM 18. This engine control unit 21 receives various information via an input/output interface 19. For instance, the engine control unit 21 receives the intake air amount Qa measured by the air-flow sensor 2, a throttle opening amount detected by a throttle sensor 13, a signal of an idle switch 14 that is turned on in an idling state, an engine cooling water temperature WT detected by a water temperature sensor 15, an air/fuel ratio feedback signal from the front oxygen concentration sensor 10 provided upstream of the front three-way catalyst 8 of the exhaust pipe 9, an engine RPM (revolutions per minute) Ne detected by a crank angle sensor 22.

Figure 2:
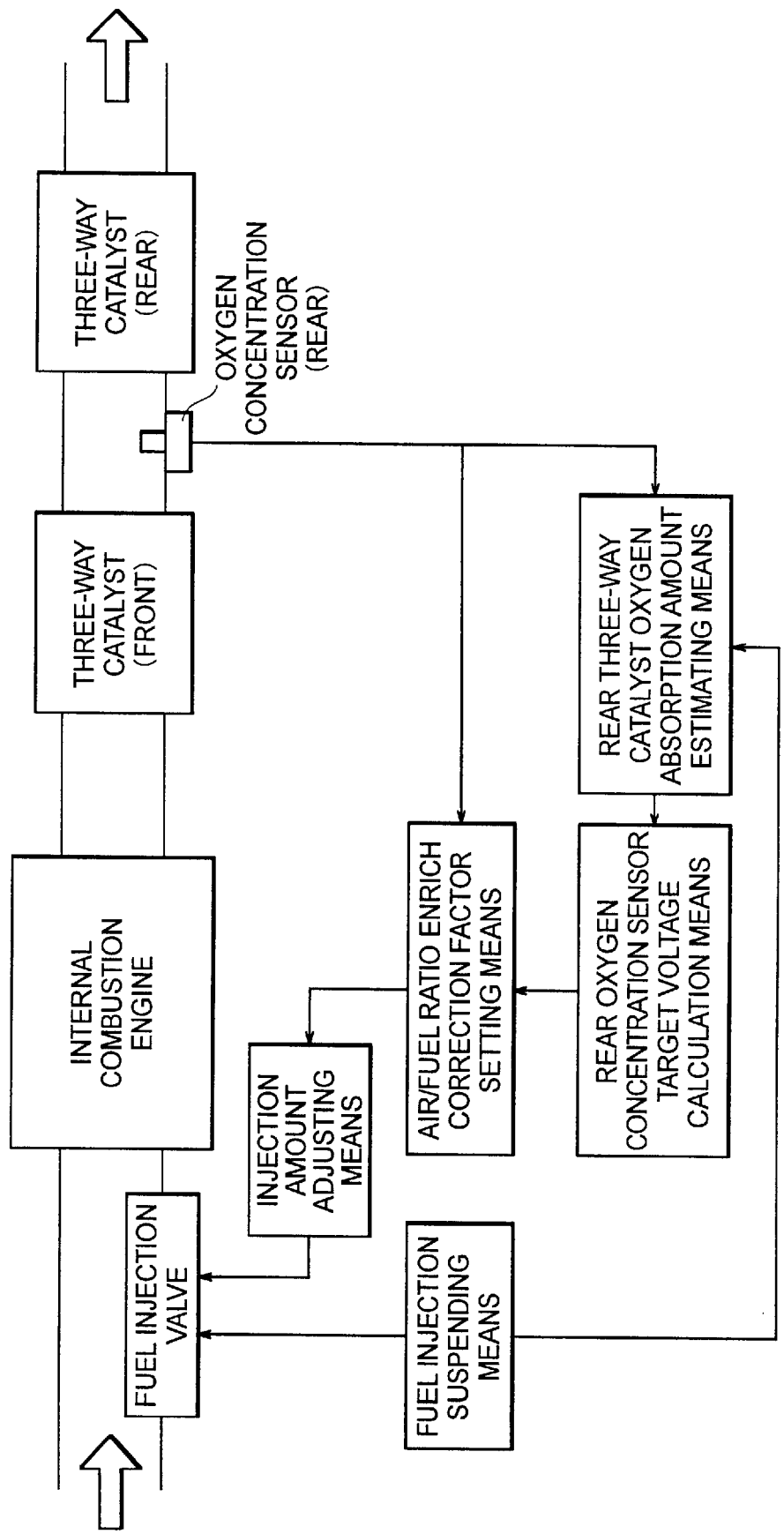
FIG. 2 is a block diagram of the air/fuel ratio control apparatus for an internal combustion engine according to the first embodiment of the present invention.

Here, a driving condition detection means is constructed of the air-flow sensor 2, the throttle sensor 13, the idle switch 14, the water temperature sensor 15, the front oxygen concentration sensor 10, and the crank angel sensor 22. Note that to facilitate understanding, shown in FIG. 2 is a block diagram of the air/fuel ratio control apparatus for an internal combustion engine shown in FIG. 1 according to the present embodiment.

Here, a fuel injection amount Qf is basically calculated in the engine shown in FIG. 1 according to the following formula.

$$Qf=\{(Qa/Ne)/\text{theoretical air/fuel ratio}\} \times CFB \times ZKAF \quad (1)$$

Here, the constants in this formula are as follows.
Qa: intake air amount
Ne: engine RPM
CFB: air/fuel ratio feedback correction factor
ZKAF: air/fuel ratio enrich correction factor Also, a basic fuel injection amount Qf0 is calculated according to the following formula to which the correction factors CFB and ZKAF for adjusting an air/fuel ratio are not applied.

$$Qf0=\{(Qa/Ne)/\text{theoretical air/fuel ratio}\} \quad (2)$$

The air/fuel ratio enrich correction factor ZKAF is a correction factor for correcting an air/fuel ratio. If air/fuel ratio feedback control is not performed, this correction factor becomes valid, and if correction is not required, this correction factor ZKAF is normally set as 1.0.

Figure 3:
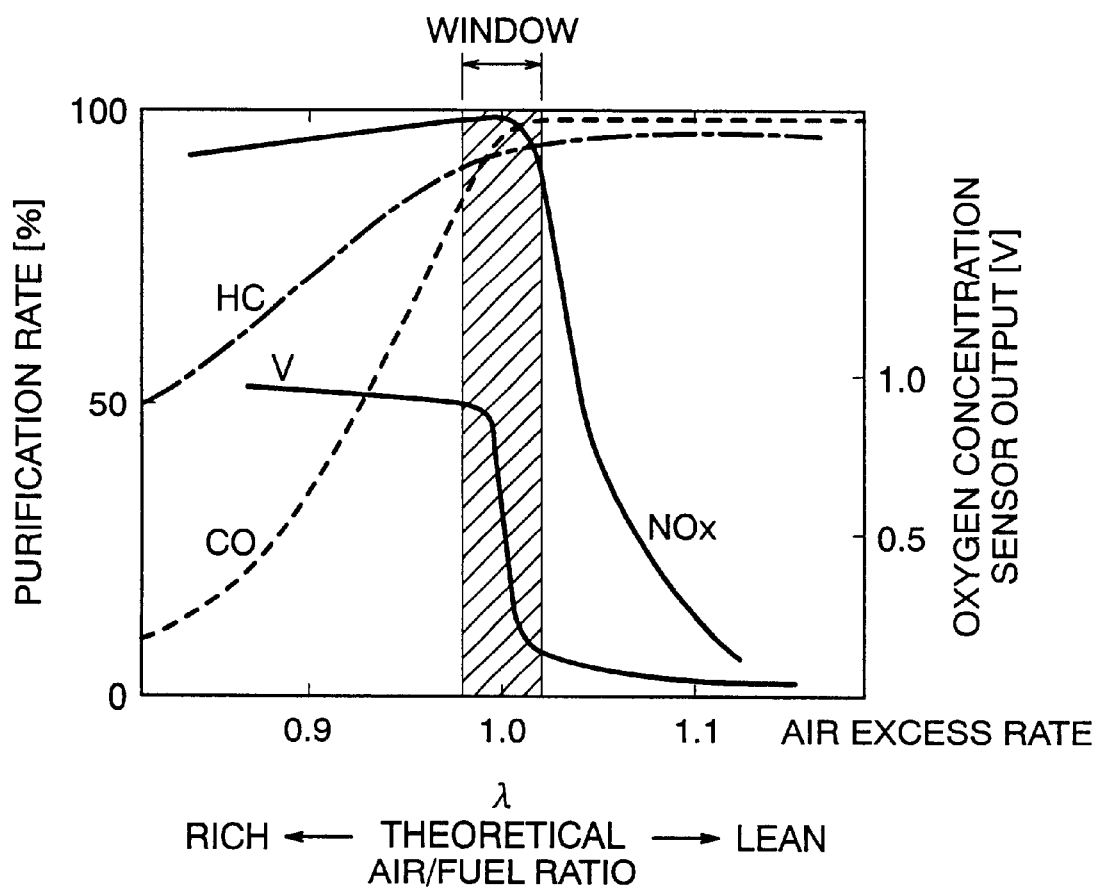
FIG. 3 is a drawing showing the relations among an air/fuel ratio, outputs of oxygen concentration sensors, and an exhaust gas purification rate in the air/fuel ratio control apparatus for an internal combustion engine according to the first embodiment of the present invention.

The air/fuel ratio feedback correction factor CFB is used to maintain an air/fuel ratio in proximity to a theoretical air/fuel ratio according to an output signal of the front oxygen concentration sensor 10. As shown in FIG. 3, if an air/fuel ratio is within a so-called window whose center is set as the theoretical air/fuel ratio, the front three-way catalyst 8 provided in the exhaust path simultaneously purifies NOx, HC, and CO in an exhaust gas at a maximum conversion efficiency.

Here, FIG. 3 is a drawing showing the relations among an air/fuel ratio, outputs of the oxygen concentration sensors, and an exhaust gas purification rate. As shown in this drawing, the oxygen concentration sensors 10 and 11 generate an output voltage of around 0.45–0.8V if the air/fuel ratio is on a slightly rich side with respect to the theoretical air/fuel ratio. Also, the oxygen concentration sensors 10 and 11 generate an output voltage of around 0.8–1.0V if the air/fuel ratio is on a significantly rich side. Further, the oxygen concentration sensors 10 and 11 generate an output voltage of around 0.45–0.2V if the air/fuel ratio is on a lean side with respect to the theoretical air/fuel ratio. Also, the oxygen concentration sensors 10 and 11 generate an output voltage of around 0.2–0.0V if the air/fuel ratio is on a significantly lean side.

The following is a description of control of the air/fuel ratio feedback correction factor CFB performed according to the output signal of the front oxygen concentration sensor 10.

Figure 4:
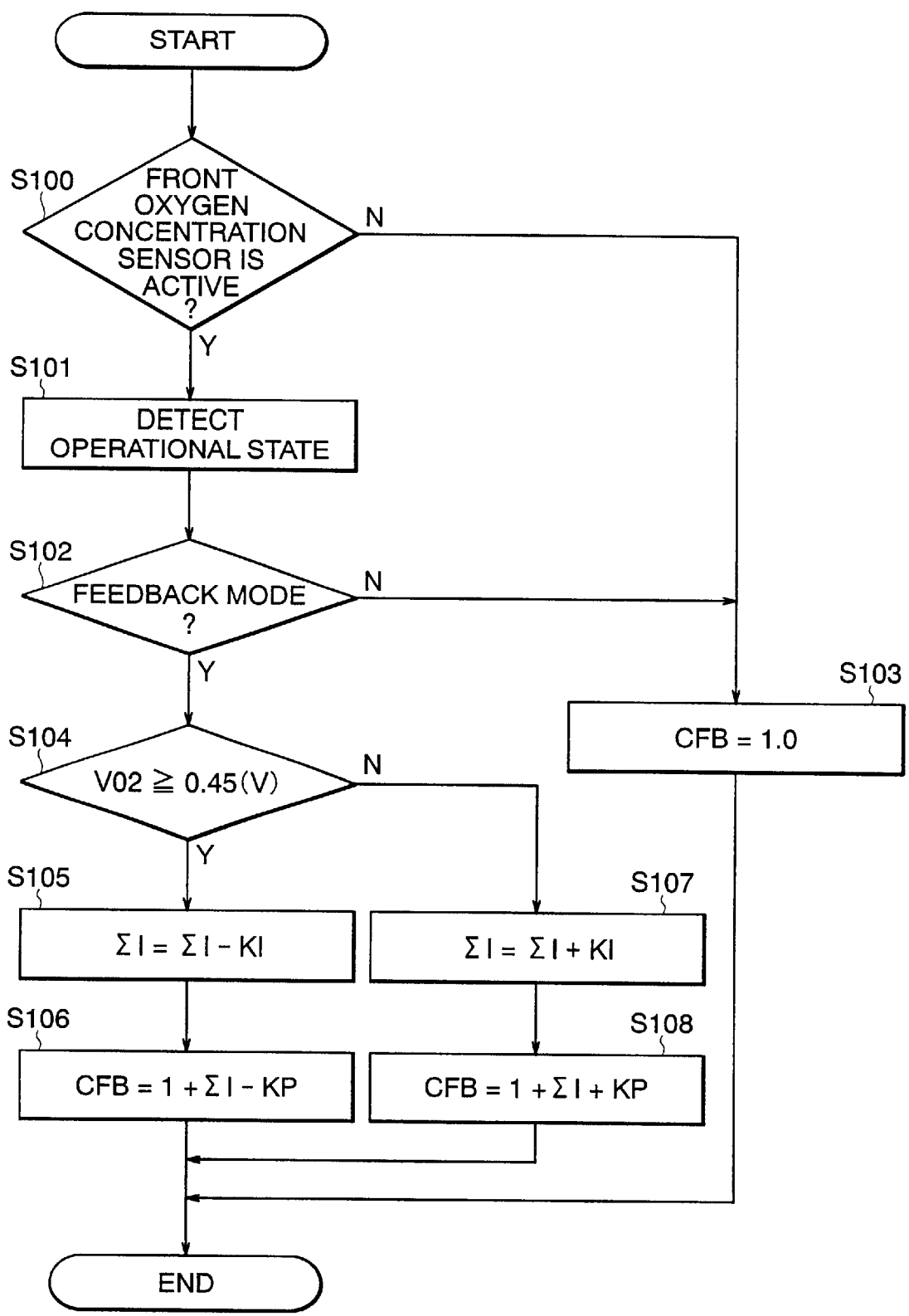
FIG. 4 is a flowchart for performing an air/fuel ratio feedback correction in the air/fuel ratio control apparatus for an internal combustion engine according to the first embodiment of the present invention.

FIG. 4 shows a routine for calculating the air/fuel ratio feedback correction factor CFG. First, in step S100, it is judged whether the front oxygen concentration sensor 10 is active. If it is judged that the front oxygen concentration sensor 10 is not yet active, the processing proceeds to step S103 in which the factor CFB is set as 1.0 and the processing is terminated. On the other hand, if it is judged that the front oxygen concentration sensor 10 is active, the processing proceeds to step S101.

In step S101, signals of the crank angle sensor 22, the air-flow sensor 2, the throttle sensor 13, and the water temperature sensor 15 are obtained and the operational state of the engine is detected.

In step S102, it is judged whether a feedback mode is set according to the operational state detected in step S101. If it is judged that the feedback mode is not set and another mode such as an air/fuel ratio correction mode or a fuel cut mode is set for correcting the air/fuel ratio using the air/fuel ratio enrich correction factor ZKAF, the processing proceeds to step S103 in which the factor CFB is set as 1.0 and the processing is terminated. On the other hand, if the feedback mode is set, the processing proceeds to step S104 in which it is judged whether the output voltage V02 of the front oxygen concentration sensor 10 is higher than 0.45[V], that is, it is judged whether the air/fuel ratio is on the rich side. If V02 0.45[V], that is, if the air/fuel ratio is on the rich side, the processing proceeds to step S105 in which a relatively small integral value KI is subtracted from a feedback integral correction factor totalized value ΣI to be described later.

In the next step S106, the air/fuel ratio feedback correction factor CFB is calculated by subtracting a relatively great skip value KP from a value obtained by adding "1.0" that is a standard value of the air/fuel ratio feedback correction factor CFB to the feedback integral correction factor totalized value ΣI calculated in step S105.

On the other hand, if it is judged that V02<0.45[V] in step S104, that is, if the air/fuel ratio is on the lean side, the processing proceeds to step S107 in which a relatively small integral value KI is added to the feedback integral correction factor totalized value ΣI.

In the next step S108, the air/fuel ratio feedback correction factor CFB is calculated by adding a relatively great skip value KP to a value obtained by adding "1.0" that is the standard value of the air/fuel ratio feedback correction factor CFB to the feedback integral correction factor totalized value ΣI calculated in step S107.

As described above, if the air/fuel is in a rich state, the air/fuel ratio feedback correction factor CFB becomes small and the fuel injection amount is reduced. If the air/fuel ratio is in a lean state, the air/fuel ratio feedback correction factor CFB becomes large and the fuel injection amount is increased. In this manner, the air/fuel ratio is maintained around the theoretical air/fuel ratio.

When the idle switch is turned on, if the engine RPM is at least equal to a predetermined value and a vehicle speed is within a predetermined range, the engine control unit 21 performs a fuel cut. Following this, if an accelerator pedal is pressed for acceleration and the idle switch is turned off, or if the engine RPM falls below a predetermined value under a condition where the idle switch is turned on, the fuel cut is reset and fuel injection is restarted.

If a fuel cut is performed, a large amount of oxygen is absorbed by the front three-way catalyst 8. Therefore, a state before the fuel cut is performed is not restored immediately after the fuel cut is reset, and an excess oxygen state occurs. In this excess oxygen state, the NOx purification action becomes inactive and the three-way catalyst cannot fully exert its effect.

Accordingly, like a conventional apparatus, it is required to set the air/fuel ratio on the rich side with respect to the theoretical air/fuel ratio for a predetermined time period after the fuel cut is reset. By doing so, oxygen absorbed by the three-way catalyst is swiftly removed and the function of the three-way catalyst is restored.

Figure 5:
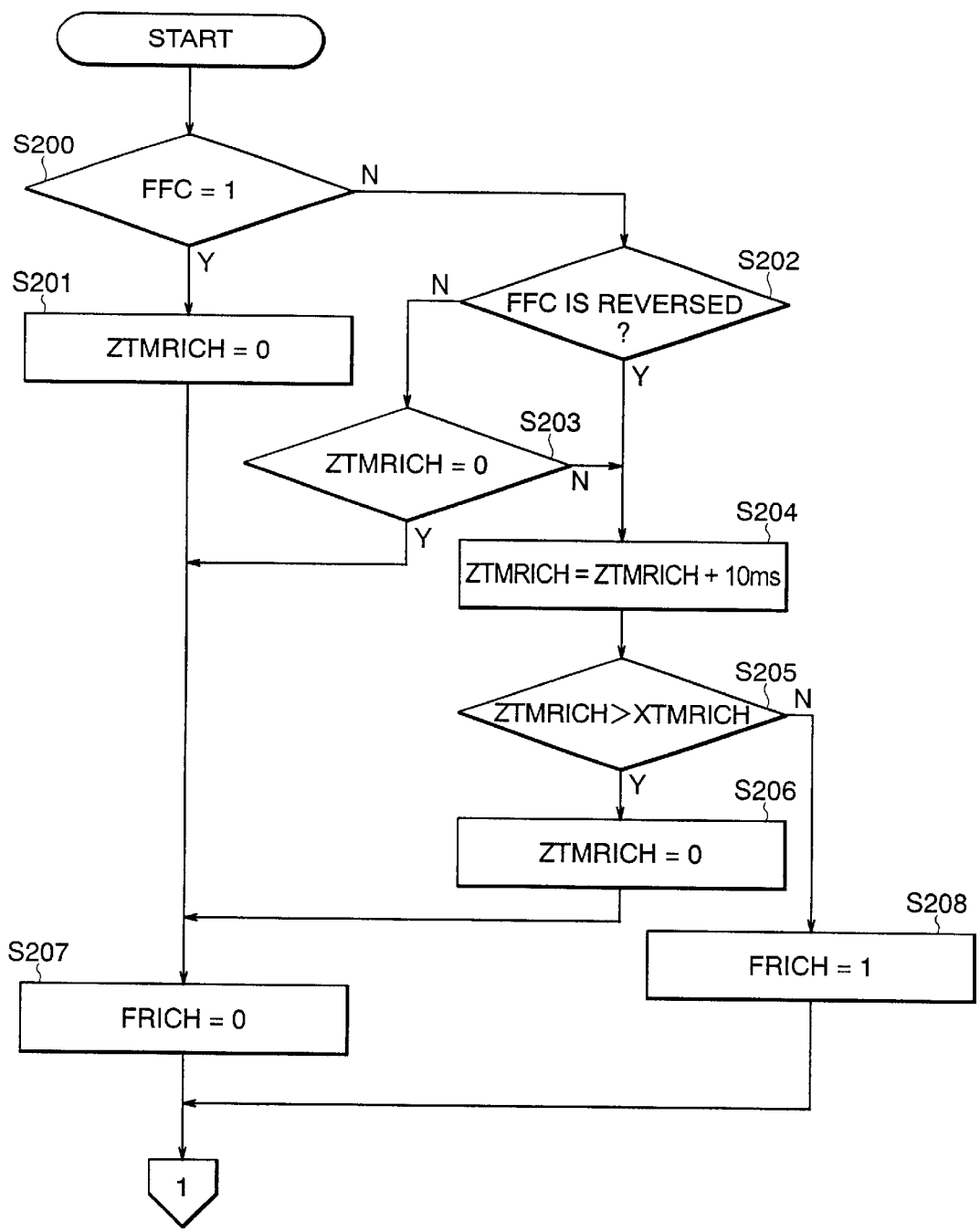
FIG. 5 is a flowchart for calculating a period during which a post-fuel cut enrich processing is performed in the air/fuel ratio control apparatus for an internal combustion engine according to the first embodiment of the present invention.

FIG. 5 is a flowchart for judging a period during which the air/fuel ratio enrich processing is performed after a fuel cut is reset. The processing shown in this flowchart is performed once every 10 ms.

In step S200, it is judged whether a fuel cut flag FFC is set as "1". If it is judged that the fuel cut flag FFC is set as "1", a fuel cut is currently performed and a post-fuel cut elapsed-time timer ZTMRICH is reset to "0" in step S201. If it is judged that the flag FFC is set as "0" in step S200, a fuel cut is not currently performed and it is judged whether the flag FFC is reversed by comparing the current FFC and a previous FFC in step S202. If the flag FFC is reversed, it is determined that the fuel cut was reset and the processing proceeds to step S204 in which post-fuel cut elapsed-time timer ZTMRICH is advanced by 10 ms and is activated.

Following this, the processing proceeds to step S205 in which it is judged whether the value of the timer ZTRICH advanced in step S204 exceeds a predetermined time XTM-RICH. If the value is not exceeding the time XTMRICH, the processing proceeds to step S208 in which an enrich control flag FRICH is set as "1" and enrich control is permitted. On the other hand, if the value is exceeding the time XTMRICH, the processing proceeds to step S206 in which the timer is set as "0" and the advancement of the timer is terminated. Then, the processing further proceeds to step S207 in which the enrich control flag FRICH is set as "0" and the enrich processing is prohibited.

On the other hand, if the judgement result in step S202 is that the flag FFC is not reversed, the processing proceeds to step S203 in which it is judged whether the value of the timer ZTRICH is "0" and, if so, it is determined that the enrich control following the reset of the fuel cut is not currently performed. Then, the processing proceeds to step S207 in which the enrich control flag FRICH is set as "0". If it is not judged that the value of the timer ZTRICH is "0" in step S203, it is determined that the enrich control is currently performed and the processing proceeds to step S204.

As described above, by performing the processing shown in FIG. 5, the air/fuel ratio enrich control flag FRICH is set as "1" and the enrich control is permitted during the post-fuel cut predetermined time XTMRICH. Also, the flag FRICH is set as "0" and the enrich control is prohibited outside the predetermined time.

Figure 6:
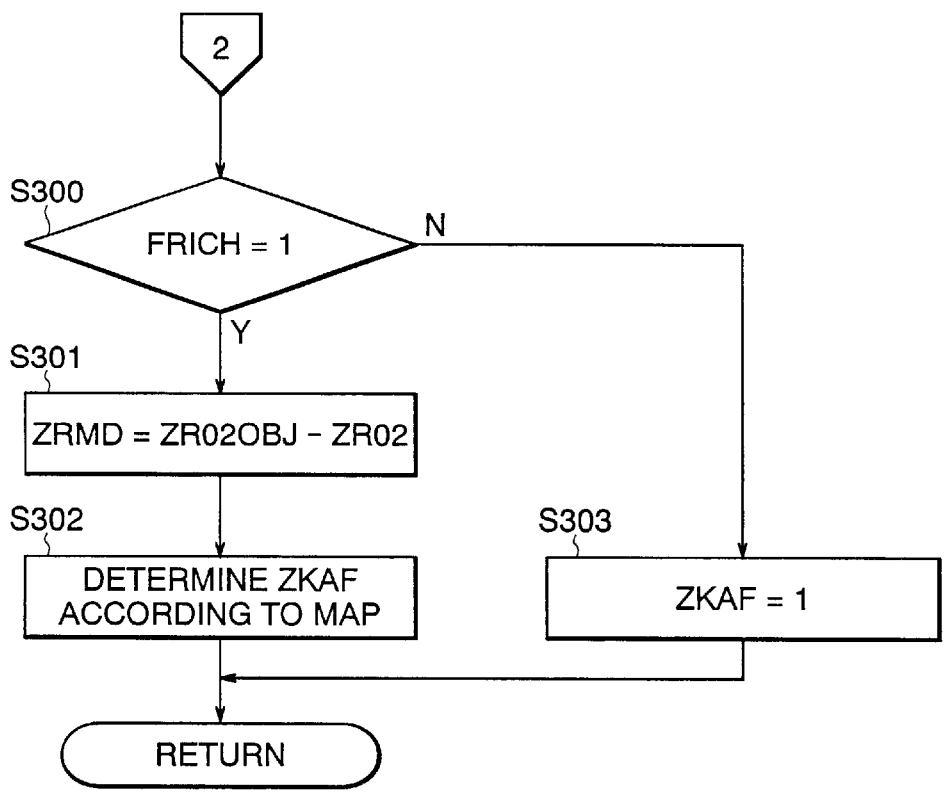
FIG. 6 is a flowchart showing post-fuel cut air/fuel ratio enrich processing performed in the air/fuel ratio control apparatus for an internal combustion engine according to the first embodiment of the present invention.

FIG. 6 is a flowchart showing air/fuel ratio enrich processing performed after a fuel cut is reset. The processing shown in this drawing is performed to succeed the processing shown in FIG. 5.

In step S300, it is judged whether the air/fuel ratio enrich control flag FRICH is set as "1" and, if so, it is determined that the post-fuel cut enrich control is currently performed and the processing proceeds to step S301. In step S301, an output voltage ZR02 of the rear oxygen concentration sensor 11 showing the amount of oxygen absorbed by the front three-way catalyst 8 is detected. Then, the difference between the detected output voltage ZR02 and an output voltage ZR02OBJ of the oxygen concentration sensor in the case of an optimal purification efficiency is calculated, and the voltage difference is inputted as a voltage ZRMD. This voltage difference represents a lean degree of the current state with respect to an optimal catalyst purification state. The output of the oxygen concentration sensor exhibiting an optimal purification state is generally around 0.5V. Therefore, although not shown in FIG. 6, the value of the voltage ZR02OBJ is set as 0.5V.

Figure 7:
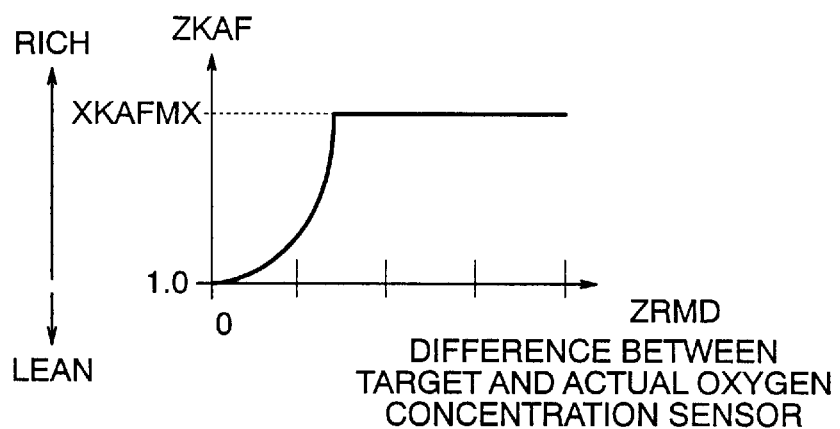
FIG. 7 shows a map concerning an rear oxygen concentration sensor and an air/fuel ratio enrich degree in the air/fuel ratio control apparatus for an internal combustion engine according to the first embodiment of the present invention.

Next, the processing proceeds to step S302 in which the voltage ZRMD representing a current lean degree of the front three-way catalyst 8 obtained in step S301 is inputted and the air/fuel ratio enrich correction factor ZKAF is outputted. FIG. 7 shows a map used to calculate an air/fuel ratio enrich degree according to the output of the rear oxygen concentration sensor. According to this map, an air/fuel ratio enrich correction factor ZKAF is calculated. Also, although a correction factor is set only on the rich side, a correction factor on the lean side may also be set in consideration of a case where enrich processing causes a situation where the output voltage of the oxygen concentration sensor exceeds a target voltage. In this case, the output voltage of the oxygen concentration sensor follows the target value.

Also, if the air/fuel ratio is too much enriched, this causes the deterioration of combustion, and the performance of the internal combustion engine is deteriorated. Therefore, it is required to impose a limitation on a correction width of the air/fuel ratio as indicated by a legend XKAFMX shown in FIG. 7. In the present embodiment, this limitation is imposed by the data setting in the map.

If it is judged in step S300 that the air/fuel ratio enrich control flag is set as "0" and the enrich control is not currently performed, the processing proceeds to step S303 in which an air/fuel ratio enrich correction factor ZKAF is given a value "1.0".

Figure 8:
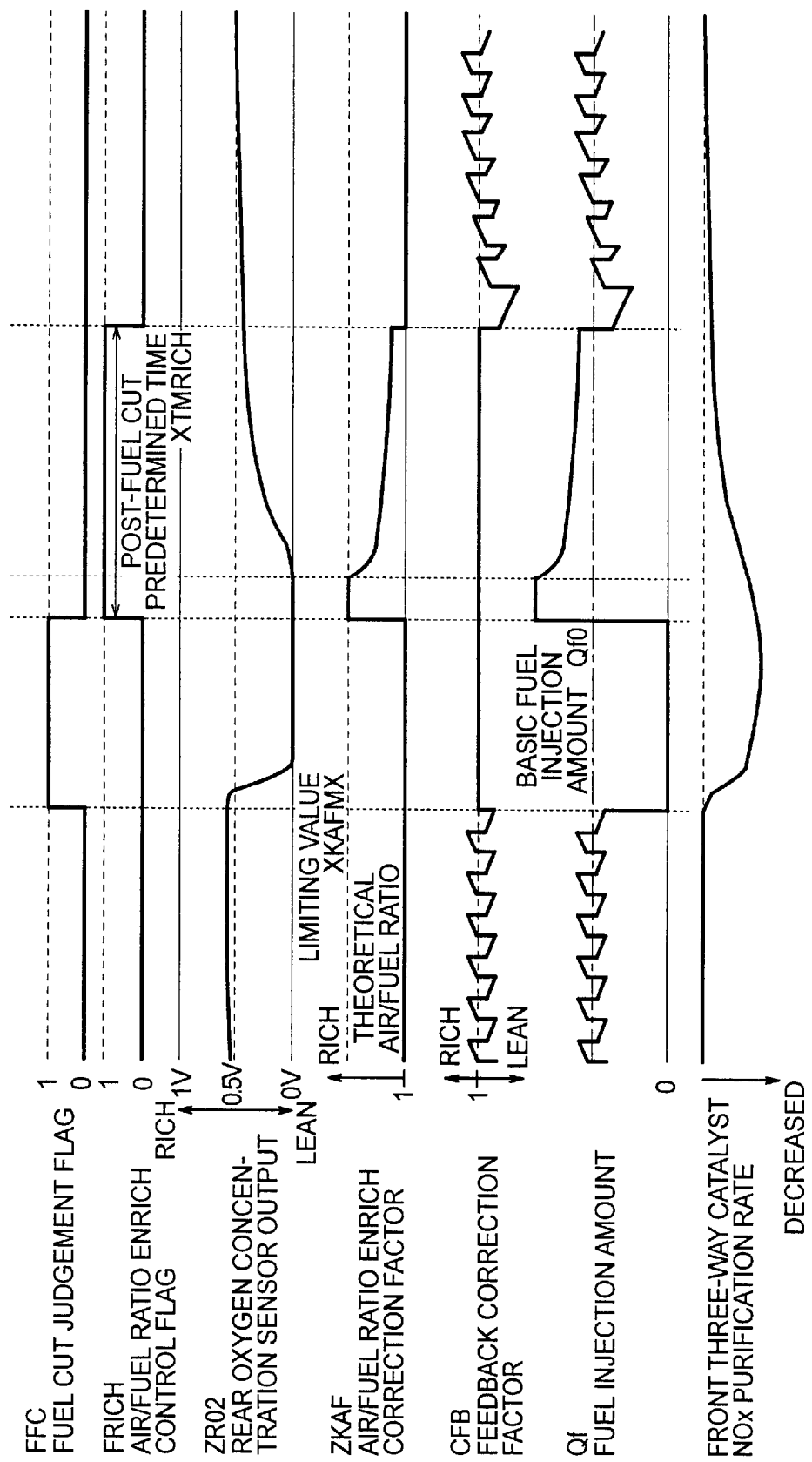
FIG. 8 is a timing chart showing the operation of the air/fuel ratio control apparatus for an internal combustion engine according to the first embodiment of the present invention.

The operation of the air/fuel ratio control apparatus for an internal combustion engine according to the first embodiment is described below. FIG. 8 is a timing chart showing the operation of the air/fuel ratio control apparatus for an internal combustion engine according to the first embodiment.

In FIG. 8, until a fuel cut judgement is made, the air/fuel ratio feedback correction factor CFB is calculated on the basis of the output signal of the front oxygen concentration sensor 10, the basic injection amount Qf0 is corrected using the air/fuel ratio feedback correction factor CFB, and feedback control is performed using the fuel injection amount Qf to maintain an air/fuel ratio around the theoretical air/fuel ratio. Here, although varying in accordance with the intake air amount Qa and the engine RPM Ne, the basic fuel injection amount Qf0 is set as a constant value for ease of explanation.

A fuel cut judgement is made, the fuel cut flag FFC is set as "1", and a fuel cut is performed. The fuel cut causes a situation where a large amount of oxygen is absorbed by the front three-way catalyst 8, the output of the rear oxygen concentration sensor 11 showing the oxygen absorption state of the front three-way catalyst 8 becomes 0V, and the NOx purification rate is significantly reduced. During the post-fuel cut predetermined time XTMRICH, the air/fuel ratio enrich control is permitted, the air/fuel ratio enrich correction factor KAF is calculated on the basis of the output of the rear oxygen concentration sensor 11, and the fuel injection amount Qf is corrected. In this manner, the air/fuel ratio enrich control is performed.

The output of the rear oxygen concentration sensor 11 converges to a value (around 0.5V) corresponding to an optimal catalyst purification rate in a short time due to the air/fuel ratio enrich control, so that the NOx purification rate reduced by the fuel cut is recovered in a short time. Also, the air/fuel ratio enrich correction factor KAF is regulated using the limiting value XKAFMX to avoid a situation where too much enriched air/fuel ratio causes the deterioration of combustion.

After the post-fuel cut predetermined time XTMRICH has passed, the air/fuel ratio enrich control is terminated and the same air/fuel ratio feedback control as that performed before the fuel cut is started.

Figure 9:
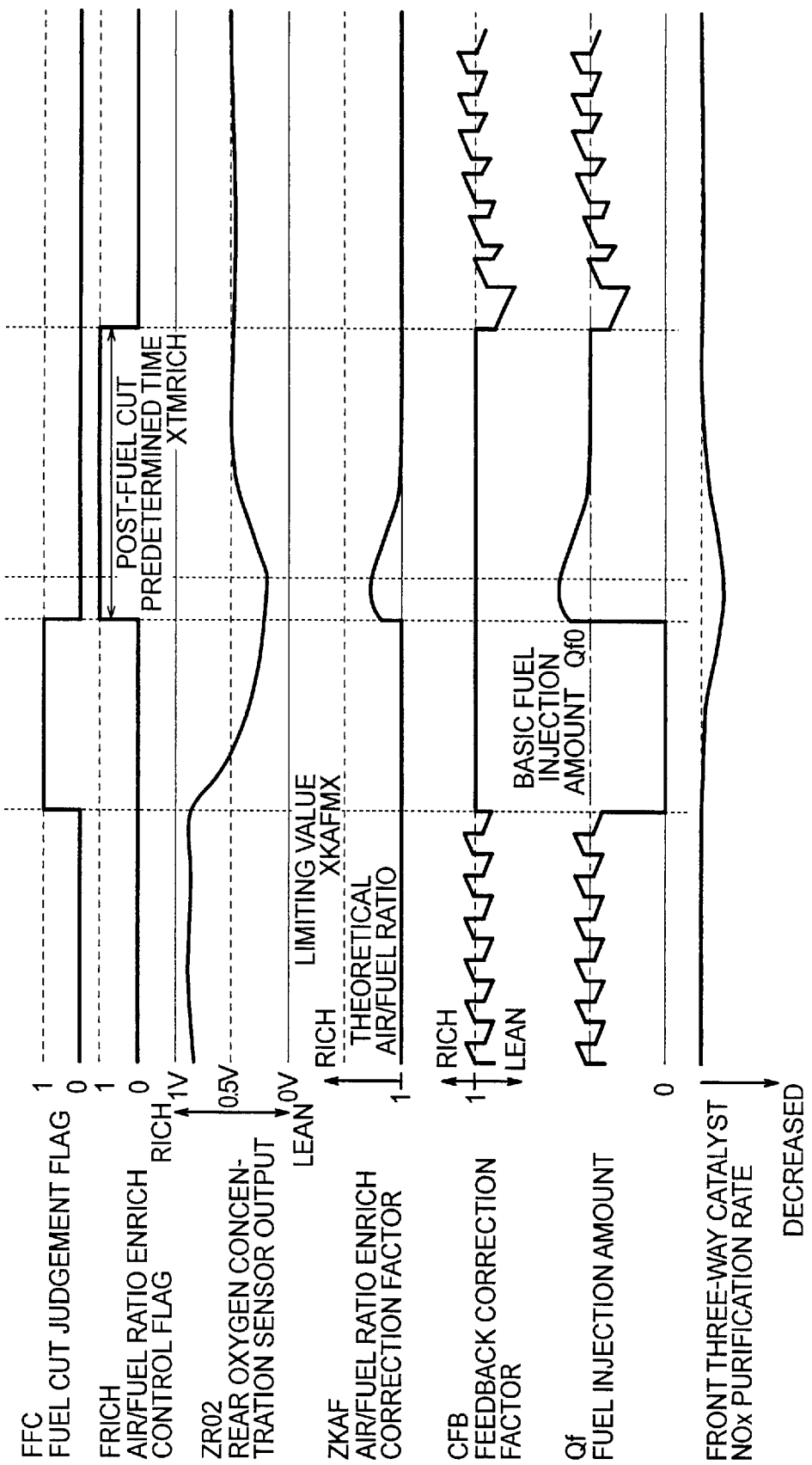
FIG. 9 is another timing chart showing the operation of the air/fuel ratio control apparatus for an internal combustion engine according to the first embodiment of the present invention.

FIG. 9 is a timing chart in the case where the oxygen absorption state of the front three-way catalyst 8 is shifted to the rich state before a fuel cut.

Even if a fuel cut supplying the same amount of oxygen as in FIG. 8 is performed under a situation where the front three-way catalyst 8 is placed in the rich state before the fuel cut, there may be cases where the amount of oxygen absorbed by the front three-way catalyst 8 is not increased to a level where the NOx purification rate is significantly reduced. Even in such a case, the enrich degree specified by the air/fuel ratio enrich correction factor KAF is determined according to the output of the rear oxygen concentration sensor 11 showing the oxygen absorption state of the front three-way catalyst 8. As a result, enrich correction is performed so that an optimal catalyst purification rate is obtained.

Accordingly, even if there are variations in the catalyst oxygen absorption amount before fuel cuts, enrich correction is performed so that an optimal catalyst purification rate is always obtained.

As described above, with the air/fuel ratio control apparatus for an internal combustion engine according to the first embodiment, the air/fuel ratio enrich processing after the reset of a fuel cut is performed according to the output of an oxygen concentration sensor arranged downstream of a catalyst. As a result, without being affected by the oxygen absorption amount of a three-way catalyst before a fuel cut, the oxygen absorbed by the three-way catalyst due to the fuel cut is swiftly removed after the fuel cut and the purification ability of the catalyst is brought back to an optimal state.

Consequently, without being affected by the variations in the oxygen absorption amount of a catalyst after fuel cuts caused by the variations in the catalyst oxygen absorption amount before the fuel cuts, enrich processing after the reset of the fuel cuts is performed according to the oxygen absorption amount of the catalyst measured after the reset of the fuel cuts. This makes it possible to avoid variations occurring when the oxygen absorbed by the catalyst due to air/fuel ratio enrich processing is not sufficiently removed and therefore the catalyst remains in the lean state and the NOx purification rate is not sufficiently recovered, or when the catalyst is in a too much enriched state and therefore the THC purification rate is reduced. As a result, the catalyst is placed in an optimal oxygen absorption state. Consequently, it becomes possible to always bring the exhaust gas purification rate of a catalyst reduced by a fuel cut back to an optimal purification rate immediately after the fuel cut is reset.

<Second Embodiment>

The air/fuel ratio control apparatus for an internal combustion engine according to the second embodiment of the present invention has a construction where a rear three-way catalyst 12 is provided downstream of the front three-way catalyst 8 and the rear oxygen concentration sensor 11. Also, the processing in the flowchart shown in FIG. 10 is added between the flowcharts shown in FIGS. 5 and 6 described in the first embodiment.

The second embodiment differs from the first embodiment in that the rear three-way catalyst 12 is additionally provided. Accordingly, the rear three-way catalyst 12 as well as the front three-way catalyst 8 absorb a large amount of oxygen supplied by a fuel cut, so that air/fuel ratio enrich control is performed to remove the oxygen absorbed by both of these three-way catalysts.

Figure 10:
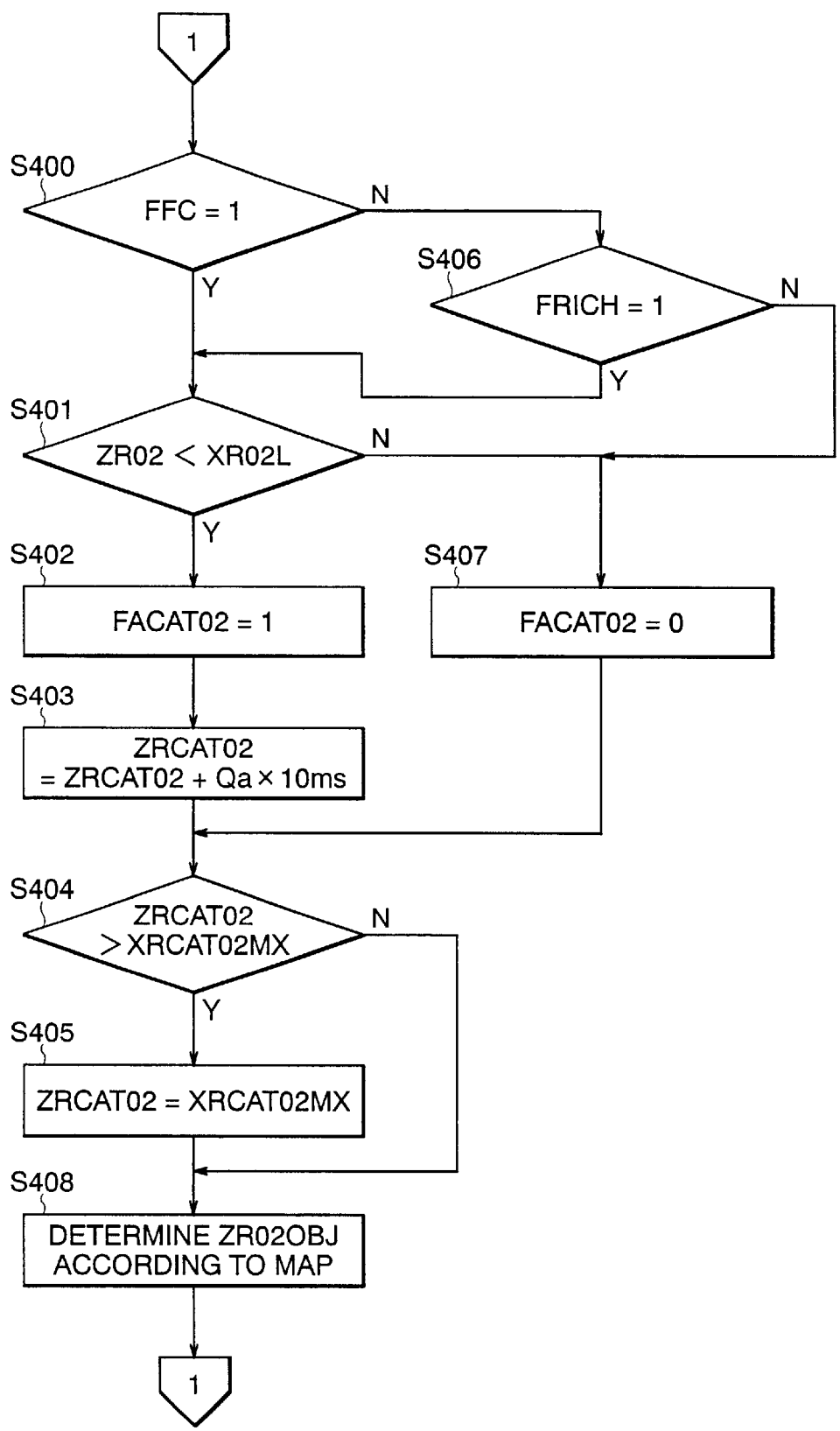
FIG. 10 is a flowchart for estimating the amount of oxygen flowing to a rear three-way catalyst and calculating the enrich degree of a front three-way catalyst in the air/fuel ratio control apparatus for an internal combustion engine according to the second embodiment of the present invention.

The flowchart in FIG. 10 shows processing inserted between FIGS. 5 and 6. By performing this processing, the amount of oxygen flowing to the rear three-way catalyst 12 due to a fuel cut is estimated using the output of the rear oxygen concentration sensor 11 and an intake air amount. Also, according to the estimated oxygen amount, it is determined how much the front three-way catalyst 8 should be enriched after the reset of the fuel cut.

In step S400, it is judged whether the fuel cut flag FFC is set as "1". If the fuel cut flag FFC is set as "1", a fuel cut is currently performed and the processing proceeds to step S401; if the fuel cut flag FFC is set as "0", the processing proceeds to step S406.

In step S406, it is judged whether the air/fuel ratio enrich control flag FRICH is set as "1". If the flag FRICH is set as "1", it is determined that post-fuel cut enrich control is currently performed and the processing proceeds to step S401. That is, if a fuel cut or enrich control is currently performed, the processing proceeds to step S401; if neither a fuel cut nor enrich control is currently performed, the processing proceeds to step S407.

In step S401, it is judged whether the output of the rear oxygen concentration sensor 11 is below a predetermined value XR02L. If the output of the rear oxygen concentration sensor 11 is below the predetermined value XR02L, it is determined that the amount of oxygen absorbed by the front three-way catalyst 8 is at a saturation level where the front three-way catalyst 8 cannot absorb oxygen supplied by a fuel cut any more and that an exhaust gas whose oxygen concentration is close to that of the air is flowing to the rear three-way catalyst 12. As a result, the processing proceeds to step S402.

A rear three-way catalyst oxygen flow judgement flag FRCAT02 judging whether oxygen is flowing to the rear three-way catalyst 12 is set as "1". On the other hand, if the output of the rear oxygen concentration sensor 11 is not below the predetermined value XR02L, it is determined that almost all oxygen supplied is absorbed by the front three-way catalyst 8 and oxygen is not supplied to the rear three-way catalyst 12. As a result, the processing proceeds to step S407 in which the rear three-way catalyst oxygen flow judgement flag FRCAT02 is set as Here, an oxygen concentration that is close to that of the air results in an output value close to 0.0V as shown in FIG. 3, so that it is appropriate to set the judgement value XR02L used for the rear oxygen concentration sensor 11 is set as a value in a range of 0.02V-0.04V that is close to 0.0V.

Also, in step S401, the judgement as to the oxygen flow to the rear three-way catalyst 12 is made during both of a fuel cut and the post-fuel cut predetermined time. This is because the rear oxygen concentration sensor 11 is arranged downstream of the fuel injection valve 7 and therefore there is a time lag before effect of a fuel cut is detected by the rear oxygen concentration sensor 11. Therefore, the post-fuel cut predetermined time is added to the conditions for the judgement.

In step S403, a calculation is performed to estimate a catalyst oxygen absorption amount by totaling the air amounts measured in a period during which it is judged that an exhaust gas whose oxygen concentration is close to that of the air is flowing to the rear three-way catalyst 12. This calculation is achieved by adding an intake air amount in a unit time "Qa×10 ms", which shows the intake air amount in a calculation cycle 10 ms, to an oxygen absorption amount ZRCAT02.

In steps S404 and S405, maximum value limiting processing is performed for the oxygen absorption amount ZRCAT02 of the rear three-way catalyst 12 using a saturation oxygen absorption amount XRCAT02MX of the rear three-way catalyst 12. If the oxygen absorption amount ZRCAT02 of the rear three-way catalyst 12 exceeds the maximum oxygen absorption amount XRCAT02MX in step S404, the processing proceeds to step S405 in which the oxygen absorption amount ZRCAT02 is set as the amount XRCAT02MX. Then, the processing proceeds to step S408. If the amount ZRCAT02 does not exceed the amount XRCAT02MX in step S404, the processing proceeds to step S408 by skipping step S405.

Figure 11:
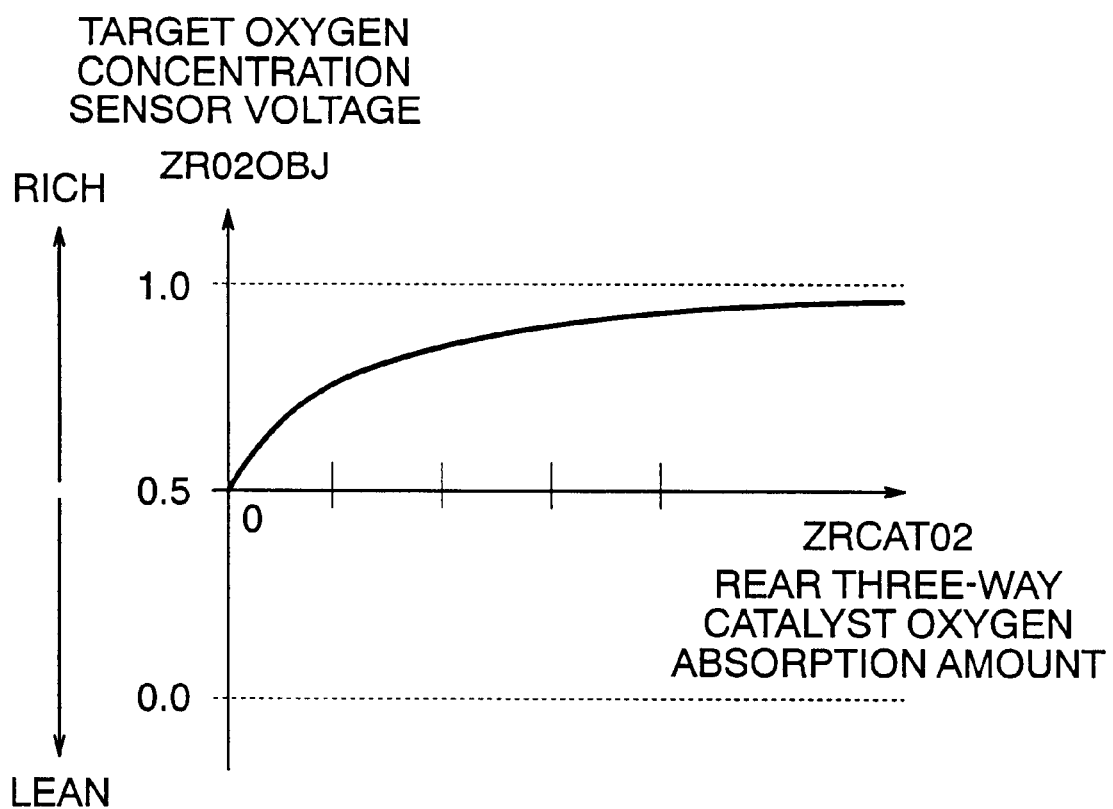
FIG. 11 is a map concerning the amount of oxygen absorbed by the rear three-way catalyst and the enrich degree of the front three-way catalyst in the air/fuel ratio control apparatus for an internal combustion engine according to the second embodiment of the present invention.

The processing finally proceeds to step S408 in which a target output voltage ZR020BJ of the rear oxygen concentration sensor 11 is calculated according to a map shown in FIG. 11, whose input is the oxygen absorption amount ZRCAT02 of the rear three-way catalyst and output is the target output voltage ZR020BJ of the rear oxygen concentration sensor 11 showing how much the front three-way catalyst 8 should be enriched. If the oxygen absorption amount ZRCAT02 is "0", it is sufficient that only the oxygen absorbed by the front three-way catalyst 8 is removed according to the set data in the map. Because it is not required to set the target output value of the rear oxygen concentration sensor 11 on the rich side, the target output value is set as 0.5V. The map has a characteristic that the target output voltage is shifted toward the rich side in accordance with the increase in the oxygen absorption amount ZRCAT02.

The flowchart in FIG. 6, which shows the post-fuel cut air/fuel ratio enrich processing described in the first embodiment, is performed to succeed the processing shown in FIG. 10 in the present embodiment. The sole difference in processing shown in FIG. 6 between the first embodiment and the second embodiment is that while the target output voltage ZR0202BJ of the rear oxygen concentration sensor 11 is fixed at a value "0.5V" in the first embodiment, the target output voltage is shifted toward the rich side in accordance with the increase in the amount of oxygen absorbed by the rear three-way catalyst 12 in the second embodiment.

Figure 12:
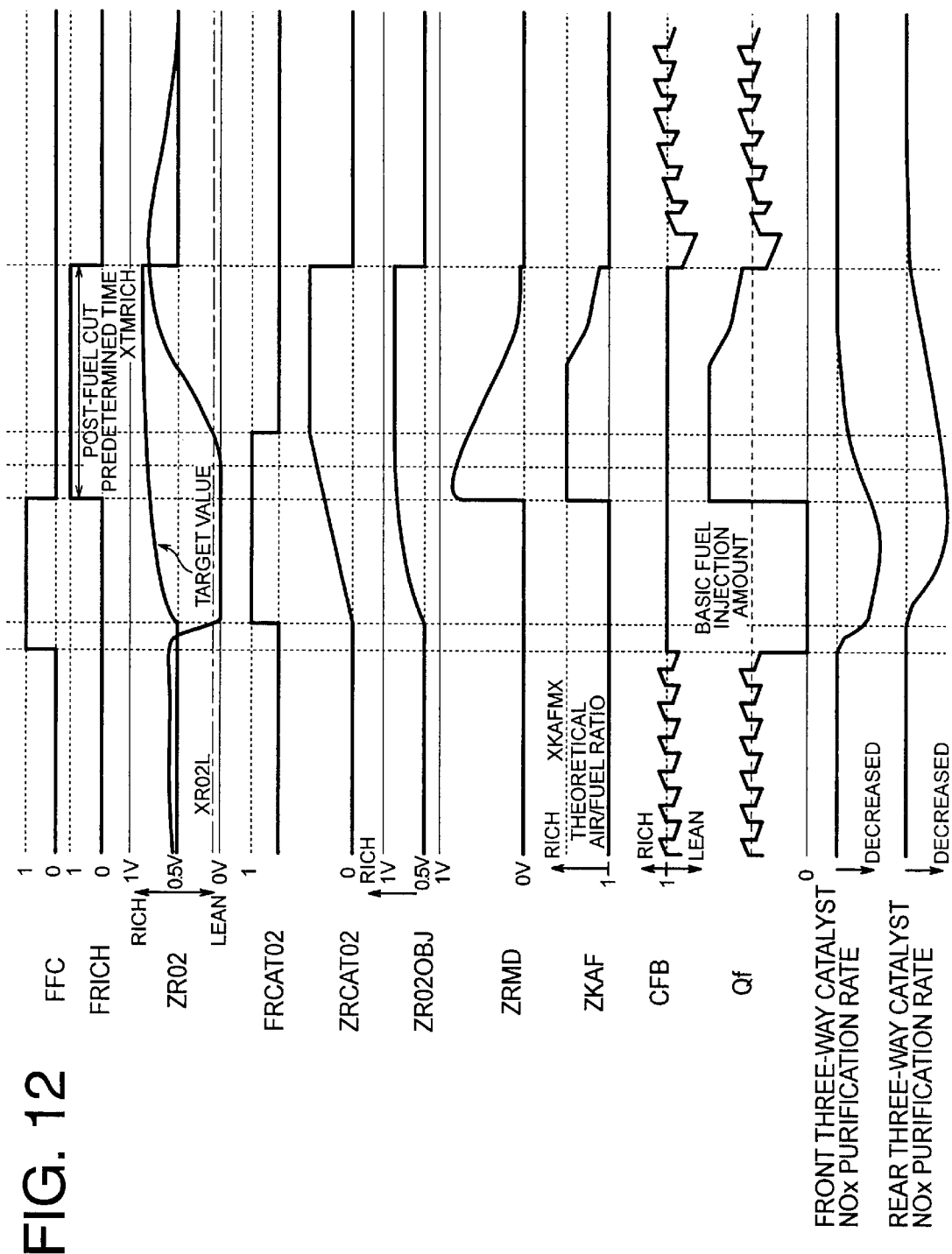
FIG. 12 is a timing chart showing the operation of the air/fuel ratio control apparatus for an internal combustion engine according to the second embodiment of the present invention.

The operation of the air/fuel ratio control apparatus for an internal combustion engine according to the second embodiment is described below. FIG. 12 is a timing chart showing the operation of the air/fuel ratio control apparatus for an internal combustion engine according to the second embodiment.

Until a fuel cut judgement is made, the air/fuel ratio feedback correction factor CFB is calculated on the basis of the output signal of the front oxygen concentration sensor 10, the basic injection amount Qf0 is corrected using the air/fuel ratio feedback correction factor CFB, and feedback control is performed using the fuel injection amount Qf to maintain an air/fuel ratio around the theoretical air/fuel ratio. Here, although varying in accordance with the intake air amount Qa and the engine RPM Ne, the basic fuel injection amount Qf0 is set as a constant value for ease of explanation.

A fuel cut judgement is made, the fuel cut flag FFC is set as "1", and a fuel cut is performed. The fuel cut causes a situation where a large amount of oxygen is absorbed by the front three-way catalyst 8, the output of the rear oxygen concentration sensor 11 showing the oxygen absorption state of the front three-way catalyst 8 becomes 0V, and the NOx purification rate is significantly decreased.

Also, if the output voltage of the rear oxygen concentration sensor 11 becomes equal to or less than the predetermined value XRO2L and the amount of oxygen absorbed by the front three-way catalyst 8 increases to a saturation level, it is determined that an exhaust gas that is close to the air is flowing to the rear three-way catalyst 12. Therefore, the rear three-way catalyst air inflow judgement flag RFCAT02 is set as "1" and the amounts of air ZRCAT02 flowing to the rear three-way catalyst 12 is totaled. When the fuel cut is reset, the target voltage ZR0202BJ of the rear oxygen concentration sensor 11 showing how much the front three-way catalyst should be enriched is calculated from the oxygen absorption amount ZRCAT02 of the rear three-way catalyst.

During the post-fuel cut predetermined time XTMRICH, air/fuel ratio enrich control is allowed, an air/fuel ratio enrich correction factor KAF is calculated from a difference ZRMD between the target output voltage and the actual output voltage of the rear oxygen concentration sensor 11, and the air/fuel ratio enrich control is performed by correcting the fuel injection amount Qf. In this manner, the front three-way catalyst 8 at a position upstream of the rear three-way catalyst 12 is shifted from a desirable state to a rich state.

Accordingly, it becomes possible to remove the oxygen absorbed by the front three-way catalyst 8 and the rear three-way catalyst 13 and to always bring the exhaust gas purification rates of the catalysts decreased by a fuel cut back to optimal purification rates immediately after the fuel cut is reset.

Also, by enriching the front three-way catalyst 8 to maintain a high NOx purification rate, the oxygen absorbed by the rear three-way catalyst 12 due to a fuel cut is removed and the inflow of NOx to the rear three-way catalyst 12 whose NOx purification rate is not yet recovered is prevented. This prevents the discharge of NOx into the air.

Note that after the post-fuel cut predetermined time XTMRICH has passed, the air/fuel ratio enrich control is terminated and the same air/fuel ratio feedback control as that performed before the fuel cut is started.

Figure 13:
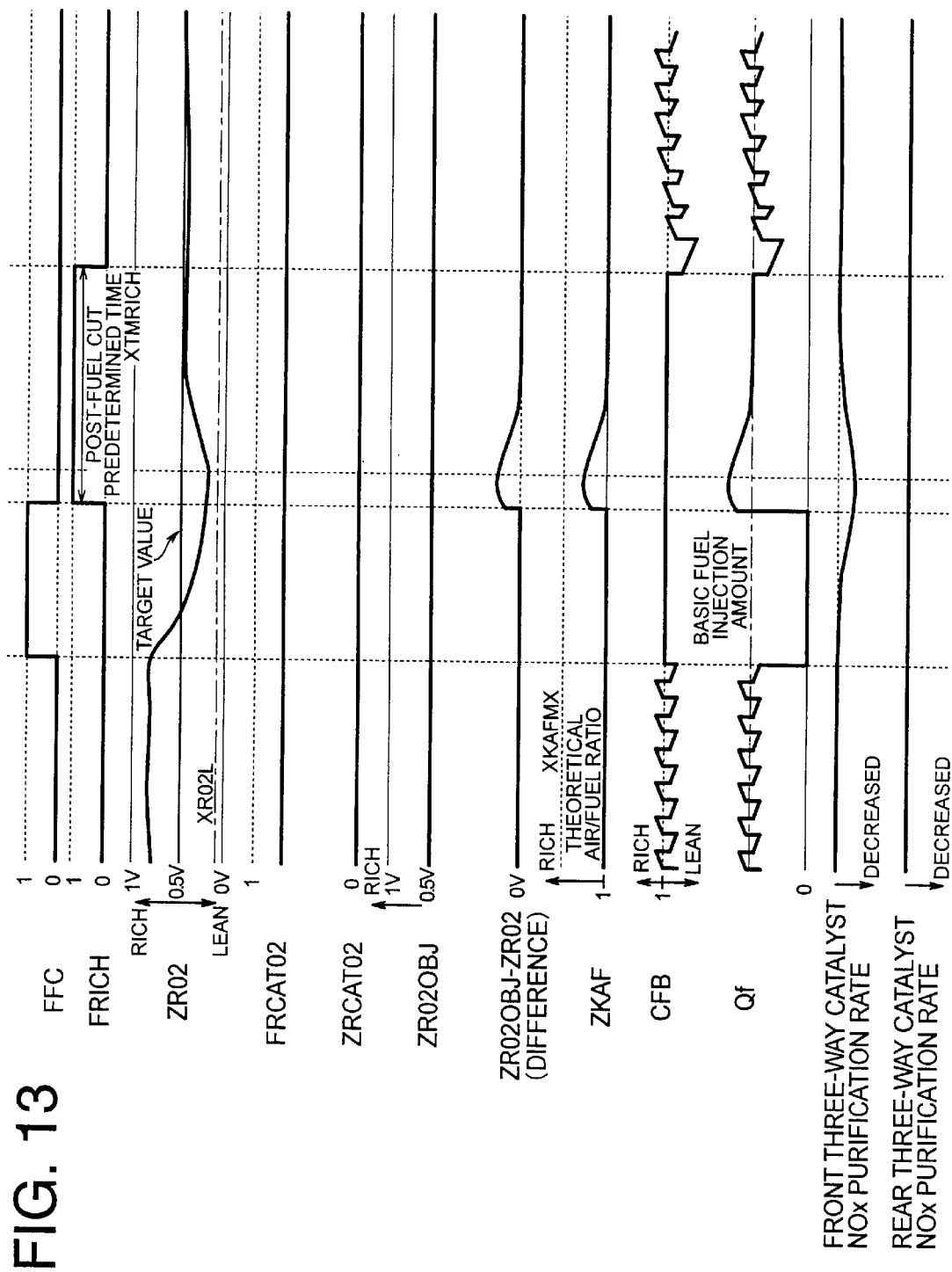
FIG. 13 is another timing chart showing the operation of the air/fuel ratio control apparatus for an internal combustion engine according to the second embodiment of the present invention.

FIG. 13 is a timing chart in the case where the oxygen absorption state of the front three-way catalyst 8 is shifted to the rich state before a fuel cut.

Even if a fuel cut supplying the same amount of oxygen as in FIG. 12 is performed under a situation where the front three-way catalyst 8 is placed in the rich state before the fuel cut, there may be cases where the amount of oxygen absorbed by the front three-way catalyst 8 is not increased to a lean level where the front three-way catalyst 8 is saturated with oxygen. In such cases, no oxygen is supplied to the rear three-way catalyst 12 and it is determined that oxygen is not absorbed by the rear three-way catalyst 12 according to the result of judgement made for the air inflow to the rear three-way catalyst 12 using the output of the rear oxygen concentration sensor 11. This means that it is not required to shift the front three-way catalyst 8 from an optimal state to a rich state, so that enrich processing is performed to remove only the oxygen absorbed by the front three-way catalyst 8.

As described above, with the air/fuel ratio control apparatus for an internal combustion engine according to the second embodiment, it is determined how much a front three-way catalyst should be enriched according to an estimated oxygen absorption amount of a rear three-way catalyst. The air/fuel ratio of air/fuel mixture supplied to an internal combustion engine is enriched according to the output of a rear oxygen concentration sensor so that the output of the rear oxygen concentration sensor showing the enrich degree of the front three-way catalyst reaches a desired enrich degree. In this manner, the oxygen absorbed by the front three-way catalyst and the rear three-way catalyst is removed. Consequently, without being affected by the variations in the oxygen absorption amount of the front three-way catalyst before fuel cuts, it becomes possible to remove oxygen absorbed by the three-way catalysts due to the fuel cuts and to bring the purification capacities of the catalysts back to optimal states immediately after the fuel cuts are reset.

Consequently, by enriching the front three-way catalyst to maintain a high NOx purification rate, the oxygen absorbed by the rear three-way catalyst 12 due to a fuel cut is removed and the inflow of NOx to the rear three-way catalyst 12 whose NOx purification rate is not yet recovered is prevented. As a result, NOx is not discharged into the air.

With the present invention, air/fuel ratio enrich processing after the reset of a fuel cut is performed according to the output of an oxygen concentration sensor provided downstream of a catalyst. Accordingly, without being affected by the amount of oxygen absorbed by a three-way catalyst before a fuel cut, the oxygen absorbed by the three-way catalyst due to the fuel cut is removed and the purification capacity of the catalyst is brought back to an optimal state immediately after the fuel cut is performed.

Also, a correction factor setting means changes a target voltage set for an oxygen concentration sensor according to the oxygen absorption amount of a rear three-way catalyst estimated by an oxygen absorption amount estimating means, so that the oxygen absorbed by a front three-way catalyst and the rear three-way catalyst is removed. As a result, without being affected by the variations in the oxygen absorption amount of the front three-way catalyst before fuel cuts, the oxygen absorbed by the three-way catalysts due to the fuel cuts is removed and the purification capacities of the catalysts are brought back to optimal states immediately after the fuel cuts are performed.

What is claimed is:

1. An air/fuel ratio control apparatus for an internal combustion engine, comprising:

a three-way catalyst that is provided in an exhaust system of the internal combustion engine and removes poisonous substances present in an exhaust gas;

an oxygen concentration sensor that detects an oxygen concentration of the exhaust gas passed through the three-way catalyst;

a fuel injection valve that injects fuel into the internal combustion engine;

an injection amount adjusting means for adjusting an amount of the fuel injected by the fuel injection valve so that an air/fuel ratio becomes a predetermined air/fuel ratio;

an fuel injection suspending means for suspending the fuel injection by the fuel injection valve on a predetermined condition concerning an operational state of the internal combustion engine; and a correction factor setting means for setting an air/fuel ratio enrich correction factor according to a difference between an output voltage of the oxygen concentration sensor and a predetermined target voltage set for the oxygen concentration sensor, wherein, during a predetermined time after a fuel cut is reset by the fuel injection suspending means, the injection amount adjusting means performs air/fuel ratio enrich processing by adjusting the amount of the fuel injected by the fuel injection valve according to the air/fuel ratio enrich correction factor set by the correction factor setting means.

2. An air/fuel ratio control apparatus according to claim 1, wherein the three-way catalyst is a front three-way catalyst, and the air/fuel ratio control apparatus, further comprising:
 a rear three-way catalyst that is provided downstream of the oxygen concentration sensor and removes poisonous substances present in the exhaust gas passed through the front three-way catalyst;
 an intake air amount detecting means for detecting an amount of intake air into the internal combustion engine; and
 an oxygen absorption amount estimating means for estimating an oxygen absorption amount of the rear three-way catalyst resulting from the fuel cut, according to the intake air amount detected by the intake air amount detecting means and the output voltage generated by the oxygen concentration sensor during the fuel cut by the fuel injection suspending means, wherein the correction factor setting means changes the target voltage set for the oxygen concentration sensor according to the oxygen absorption amount of the rear three-way catalyst estimated by the oxygen absorption amount estimating means.

* * * * *